Figure 1:
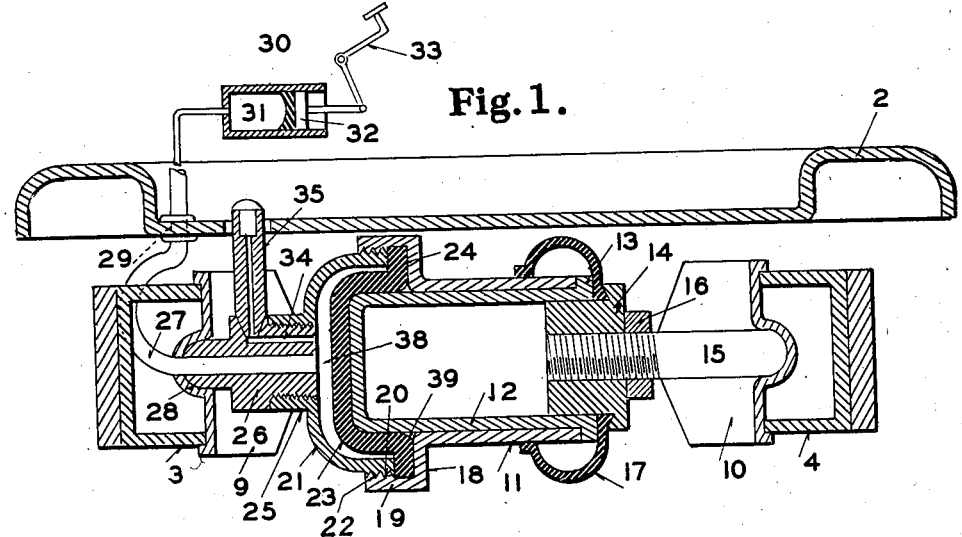

March 17, 1936.    S. SCHNELL    2,034,538

BRAKING APPARATUS

Filed Sept. 17, 1931

Inventor
S. SCHNELL
By E. E. Huffman
Att'y.

Patented Mar. 17, 1936

2,034,538

UNITED STATES PATENT OFFICE 2,034,538

BRAKING APPARATUS

Steve Schnell, St. Louis, Mo., assignor to Wagner Electric Corporation, St. Louis, Mo., a corporation of Delaware Application September 17, 1931, Serial No. 563,257

4 Claims. (Cl. 60—54.6)

My invention relates to braking apparatus and especially to improvements in wheel cylinders for hydraulic braking systems. In such systems it is customary to provide a cylinder and a piston or a pair of pistons to expand the adjacent free ends of the shoes or band into engagement with the drum by means of fluid under pressure supplied from a suitable source. Since there must be relative movement between the piston and the cylinder to secure the expanding action, there is always the possibility of leakage of fluid between the adjacent piston and cylinder walls which would result in a very inefficient braking system. In the conventional type of wheel cylinder this leakage has been prevented by the use of free rubber sealing cups having a flat base lying against the flat head of the piston. These cups are provided with a slight clearance at the corners between the piston and the cylinder, and when fluid pressure is applied to the cylinder to move the piston the inside of the sealing cup is subjected to pressure in all directions which expands the lip and base thereof against the wall of the cylinder and into the corners to prevent leakage. This expansion of the lip and the base of the cup, while fairly effective in preventing leakage, has the disadvantage of causing considerable friction as the cup is moved with the piston under action of the fluid pressure, thereby decreasing the total efficiency of the braking system.

One of the objects of my invention is to embody an elastic sealing cup between the head of the piston and the walls of the cylinder of a fluid brake system that will produce an absolutely fluid-tight pressure chamber which is not dependent upon the fluid pressure for its sealing effect, said sealing cup also being so embodied in the cylinder that upon expansion of the fluid chamber little or no friction will be added to the moving parts to decrease the efficiency of the braking system.

Another object of my invention is to surround the head of the piston in a fluid brake cylinder with an elastic sealing cup that is attached to the walls of the cylinder and which is normally under tension when the brake shoes are held in disengaged position by the return springs of the brake shoes, thereby decreasing the amount of fluid pressure necessary to initially engage the brake shoes with the drum.

Still another object of my invention is to devise a sealing cup for a cylinder and piston of a hydraulic brake system that is compressed instead of stretched by the fluid pressure as the piston is actuated.

Other objects will become apparent from the following description of my invention taken in connection with the accompanying drawing disclosing embodiments thereof.

Figure 2:
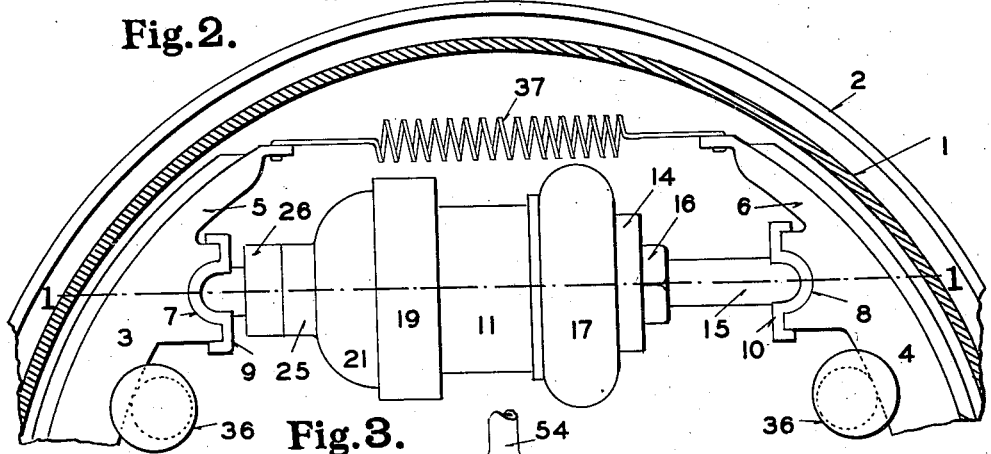
Figure 3:
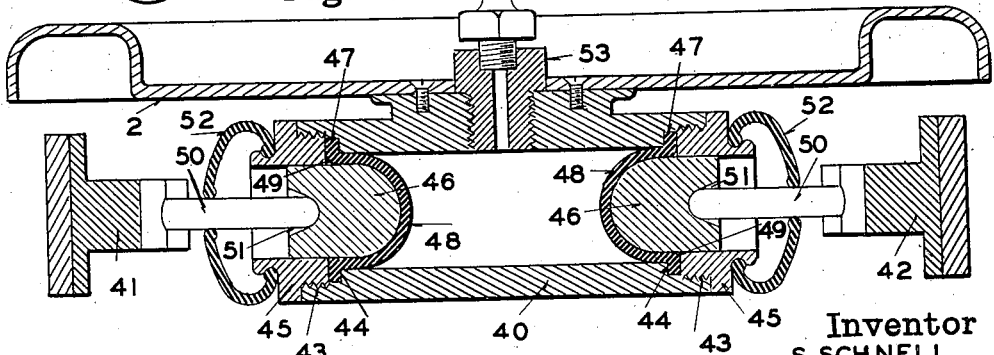

In the drawing Figure 1 is a cross sectional view taken on the line 1—1 of Figure 2, disclosing my invention applied to a floating type of wheel cylinder of a fluid braking system; Figure 2 is a front view of the wheel cylinder and cooperating brake structure disclosed in Figure 1; and Figure 3 is a cross sectional view of a fixed wheel cylinder having two pistons each provided with my improved sealing means.

Referring to the drawing in detail, and especially to Figures 1 and 2, the numeral 1 indicates a brake drum suitably secured to a vehicle wheel and closed at its open side by a backing or dust plate 2 fixed to the vehicle. A pair of brake shoes 3 and 4 are pivoted to the backing plate in the well known manner and their free ends are adapted to be expanded into engagement with the drum 1. The free ends 5 and 6 of the brake shoes are provided with cut-out portions 7 and 8, respectively, for the reception of the yokes or sockets 9 and 10.

A steel cylinder 11, open at both ends, is interposed between the free ends 5 and 6 of the brake shoes and has slidable therein a cup-shaped piston 12 provided with a flanged peripheral end 13 engaging one end of the cylinder 11 to limit its movement in one direction. A plug 14 encloses the open end of the piston and carries an adjustable thrust rod 15 for engagement with the yoke 10 in the end of the shoe 4. A lock nut 16 on the rod 15 is adapted to hold the rod in adjusted position. A flexible boot 17 surrounds the end of the cylinder and the piston to exclude dust.

The opposite end of the cylinder 11 is enlarged to provide an abutment flange 18 and a cylinder head receiving portion 19 having internal threads 20. The cylinder head 21 is cup-shaped in form with its inner diameter slightly greater than the inner diameter of the cylinder 11, and has external threads 22 for cooperating with the internal threads 20. The head of the piston 12 is adapted to extend into the cylinder head 21 when the flange 13 abuts the cylinder end. An elastic sealing cup 23, preferably made of rubber, surrounds the piston head and is provided with a peripheral flange 24 securely held against the flange 18 of the cylinder by means of the threaded end of the cylinder head 21. The sealing cup is moulded to a length shorter than that shown in Figure 1 so that the piston, when in its retracted position, as shown, will stretch the cup, i. e. increase its normal length.

The bottom of the cup-shaped cylinder head has formed thereon a tubular neck 25 having internal threads for the reception of the fitting member 26 of a flexible conduit 27. The end of the fitting member adjacent the connection with the conduit is ball-shaped and abuts against the depressed surface surrounding a recess 28 in the yoke 9 through which the conduit extends. The conduit passes through an opening 29 in the backing plate and is connected to a power source, such as a compressor 30, comprising a cylinder 31 and a piston 32 reciprocable therein by a brake pedal 33. The fitting member 26 is also provided with a passage 34 leading to a bleeder valve 35 extending to the outside of the backing plate for the discharge of air from the system.

An adjustable eccentric stop 36 is mounted in the backing plate, adjacent the inner side of the free end of each brake shoe, for adjusting the "off" position clearance between the shoes and the drum. A spring 37 is also provided between the free ends of the shoes for retracting the shoes against the stops 36 after the fluid pressure has been released.

In the operation of my improved wheel cylinder, the compressor, the flexible conduit, and fluid chamber 38 between the head of the cylinder and the piston, are completely filled with fluid. When the brake pedal is in its normal inoperative position the spring 37 holds the shoes 3 and 4 in disengaged position against the stops 36 and, by means of the fitting 26 and thrust rod 15, holds the piston and cylinder in the relation disclosed in Figure 1, whereby the sealing cup 23 is stretched. The spring 37 must be of sufficient strength to stretch the sealing cup when the fluid in the chamber 38 is not under pressure. When the operator desires to apply the brakes, the brake pedal is depressed, thereby forcing liquid under pressure into the chamber 38, causing a relative movement between the piston and the cylinder to expand the ends of the brake shoes into engagement with the drum. This initial pressure to engage the brakes need only be enough to overcome the force of the spring in excess of the force of the stretched sealing cup. It is thus seen that by this arrangement the piston moves freely during the first part of the stroke and at a low line pressure. After the shoes are initially engaged with the drum, additional pedal pressure produces additional braking pressure as desired.

Since the entire surface of the sealing cup, forming one wall of the fluid chamber 38, is subject to equal fluid pressure and the opposite surface adjacent the piston lies flat against the head of the piston, there is no danger of the cup wrinkling as it contracts and the piston is advanced. This is an important feature for by preventing wrinkling the life of the cup is greatly extended. Also, the fact that the sealing cup contracts on the piston head as the piston is advanced, the friction between the head and the cup is decreased. To further decrease the friction the inner periphery of the flange 24 is beveled, as shown at 39, to provide a clearance to prevent chafing at the point where the flange 18 of the cylinder and the piston meet. Even if the lining of the shoes should wear sufficiently so that it is necessary to move the piston head beyond the position of the bottom of the cup when the latter is of normal (molded) length, the sealing cup will not wrinkle, due to the fact that the fluid pressure in the chamber will keep it pressed down on the piston head at all points and the cup will only thicken or become more compressed, its length being reduced to less than its normal length.

Referring to Figure 3, I have disclosed my novel sealing cups applied to a fixed wheel cylinder having two moving pistons. The cylinder 40 is suitably secured to the backing plate 2 between the free ends of a pair of brake shoes 41 and 42. Each end of the cylinder is provided with internal threads 43 adjacent the abutment shoulders 44. Screwed into each end of the cylinder is a hollow plug member 45 having an internal diameter slightly smaller than the diameter of the cylinder 40 for receiving the actuating pistons 46. Surrounding the head of each piston and secured to the cylinder wall between each shoulder 44 and the plug member 45, by means of a flange 47 is my novel rubber sealing cup 48. The inner periphery of the flange is beveled, as shown at 49, to prevent chaffing. A thrust rod 50 is connected to each brake shoe and extends into a hollow recess 51 of the pistons. Boots 52 surround the thrust rods at the ends of the plugs 45 to exclude dust. A suitable spring is provided to retract the shoes against adjustable stops in a manner similar to that shown in Figures 1 and 2. The return spring is of sufficient strength to stretch the sealing cups 48 when the shoes are retracted against the stops. The cylinder is provided with a plug 53 extending through the backing plate and into which is screwed a conduit fitting 54 for conducting fluid under pressure to the cylinder.

My invention has also been found to be highly useful in holding the initial pedal pressure low on band type brakes as the stretched rubber cups materially decrease the pressure necessary to overcome the natural resiliency.

Having fully described my invention, what I claim as new and desire to secure by Letters Patent of the United States is:

1. In a fluid motor, a cylinder, a piston reciprocable therein and forming with the cylinder a fluid pressure chamber, an elastic sealing cup secured to the cylinder wall and embracing the head and peripheral wall of the piston in all operative positions of the piston, the fluid when under pressure acting on the outer surface of the cup to move the piston, said cup being held at all times in unwrinkled engagement with the head and peripheral wall of the piston and the cup being so positioned and dimensioned that it is of normal length when the piston is in a position intermediate its extreme limits of travel, whereby movement of the piston under action of liquid pressure to a point beyond said intermediate position causes a reduction in the normal length of the cup and movement of the piston to retracted position increases the normal length of the cup.

2. In a fluid motor, a cylinder, a piston reciprocable therein and forming with the cylinder a fluid pressure chamber, an elastic sealing cup secured to the cylinder wall and embracing the head and peripheral wall of the piston, the fluid in said cylinder when under pressure acting on the outer surface of the cup to move the piston, the cup being so positioned and dimensioned that movement of the piston to fully retracted position longitudinally stretches the cup, and movement of the piston under action of liquid pressure to a point beyond a point intermediate the limits of its operative travel causes a reduction in the normal length of the cup and a contraction of the cup material over the entire portion subjected to fluid pressure.

3. In a fluid motor, a cylinder, a piston reciprocable therein and forming with the cylinder a fluid pressure chamber, an elastic sealing cup secured to the cylinder wall and embracing the head and peripheral wall of the piston in all operative positions of the piston and being longitudinally stretched when the piston is in retracted position, the fluid in said chamber when under pressure acting on the outer surface of the cup to move said piston and cause the cup to first assume its normal length and then to be reduced in length, the material of the cup being at all times on one side of the line of its attachment to the cylinder.

4. In a fluid motor, the combination of a cylinder having a piston guide portion, a piston having a guide portion reciprocable therein, said cylinder having a liquid receiving portion of larger diameter than the guide portion of the piston, the head of said piston extending into said larger portion in all of its operative positions, an elastic sealing cup secured to the cylinder wall and embracing the peripheral wall of the piston in all operative positions of the piston, the fluid when under pressure acting on the outer surface of the cup to move the piston and said cup being held at all times in unwrinkled engagement with the head and the peripheral wall of the piston and the cup being so positioned and dimensioned that it is of normal length when the piston is in a position intermediate its extreme limits of travel, whereby movement of the piston under action of liquid pressure to a point beyond said intermediate position causes reduction in the normal length of the cup and movement of the piston to retracted position increases the normal length of the cup.

STEVE SCHNELL.